Patented May 8, 1928.

1,668,903

UNITED STATES PATENT OFFICE.

ALFRED B. HASLACHER, OF FARMINGTON, CALIFORNIA.

PRESERVING VEGETABLE PRODUCE.

No Drawing. Application filed September 22, 1926. Serial No. 137,166.

My invention has for its object the preservation with the original unimpaired flavor and edible qualities of vegetable produce generally from the time immediately after it is gathered until it is to be put to use.

A further object is the preservation of corn on the cob as I have found that my invention is, among others, particularly adapted to this vegetable product, whereby the corn retains all of its original flavor and edible characteristics existing at the time it is gathered and all contamination of the flavor by absorption from the vegetable stalk or corn cob is avoided, the flavor of the corn grains exactly as when prepared for consumption in their freshest state, being fixed and retained by my process until ready for use.

Other objects will appear from specifications which follow:

These objects I attain by a heating step by which certain of the chemical constituents of the vegetable, and to some degree the physical characteristics as the hardness or solidification of the grain ingredients is accomplished before the absorption of deleterious flavor from the vegetable stalk or corn cob and when so prepared immediately thereafter immersing the produce in water and freezing and retaining it so frozen until ready for use.

As an example of my process I will describe the preservation of corn on the cob. I take the freshly picked and cleaned ears of corn and immerse these in cold water and bring it to a boil and retain it at the boiling temperature for a period of about three minutes. The corn thus prepared is then cooled and while immersed in water is then frozen solid. To secure the best results I have found that it is advantageous to retain the corn immersed in water throughout the several process steps, although the water may be changed, thus the boiling water may be thrown off then cold water substituted and then the corn so immersed frozen or if preferred the corn may be frozen in the water in which it is originally boiled.

The boiling step expels any entrained air and fixes the transformed chemical constituents which under the subsequent freezing temperature prevent absorption from the vegetable stalk or cob of deleterious flavoring ingredients, therefore resulting in a preservation of the purest and sweetest taste in the produce when finally used.

While I have described my invention as specifically applicable to corn on the cob, it may be also employed advantageously with various other vegetable produce and I have found it particularly adapted to peas, artichokes, asparagus, rhubarb and other fruits and vegetables all belonging to the vegetable kingdom and when specifying vegetable produce in my claims I wish to be understood as claiming edible products from the entire vegetable kingdom, whether fruits or vegetables, and although I have described the heating step as a boiling step in the above example, I wish to be understood as claiming heating by steam or otherwise, where the heating step functions to produce the requisite chemical and physical changes in the produce being treated, and while I have described the boiling as causing the elimination of entrained air, I wish to be understood as claiming such process steps as may secure the elimination of any entrained air as by subjecting the produce to vacuumization.

Reference is herein made to my issued Patent No. 1,586,898 of June 1st, 1926, wherein the preservation of food products in a frozen condition, while immersed, is set forth. Attention is directed to this invention as an improvement thereon in that it is directed to attaining the aforesaid chemical and physical changes in the produce before subjecting to the freezing. In this way, the inter-transmission of flavoring matter or further chemical action between the stalk, stem or cob and the grains, or the kernel within fruit and the fleshy part of the fruit, is eliminated or retarded to a degree sufficient to make any such contamination entirely inappreciable in the finished product, and the gist of my invention is the heating of the produce to a sufficient degree only, to establish the chemical and physical changes aforesaid and fix the chemical condition against further deterioration prior to immersion and freezing.

I claim:

1. The process of preserving vegetable produce which consists of immersing the said produce in water and then subjecting to a vacuum to extract any entrained air and thereafter freezing said produce immersed in water and retaining in a frozen condition until ready for use.

2. The process of preserving vegetable produce which consists of bringing the said produce to a temperature of substantially 210° F. to change the physical and chemical characteristics of said produce and while immersed in said water subjecting to a vacuum to abstract any entrained air and thereafter freezing said produce immersed in water.

3. The process of preserving vegetable produce which consists of bringing the said produce to a temperature of substantially 210° F. to change the physical and chemical characteristics of said produce and thereafter freezing said produce immersed in water.

4. The process of preserving vegetable produce which consists of immersing said produce in water and boiling for a period of substantially three minutes and then freezing said produce while immersed in water.

5. The process of preserving corn on the cob as set forth in claim 1.

6. The process of preserving corn on the cob as set forth in claim 2.

7. The process of preserving corn on the cob as set forth in claim 3.

8. The process of preserving corn on the cob as set forth in claim 4.

ALFRED B. HASLACHER.